Dec. 21, 1948.  J. A. SCHARWATH  2,457,070
APPARATUS FOR MAKING BUILDING UNITS
Filed July 13, 1944  5 Sheets-Sheet 1
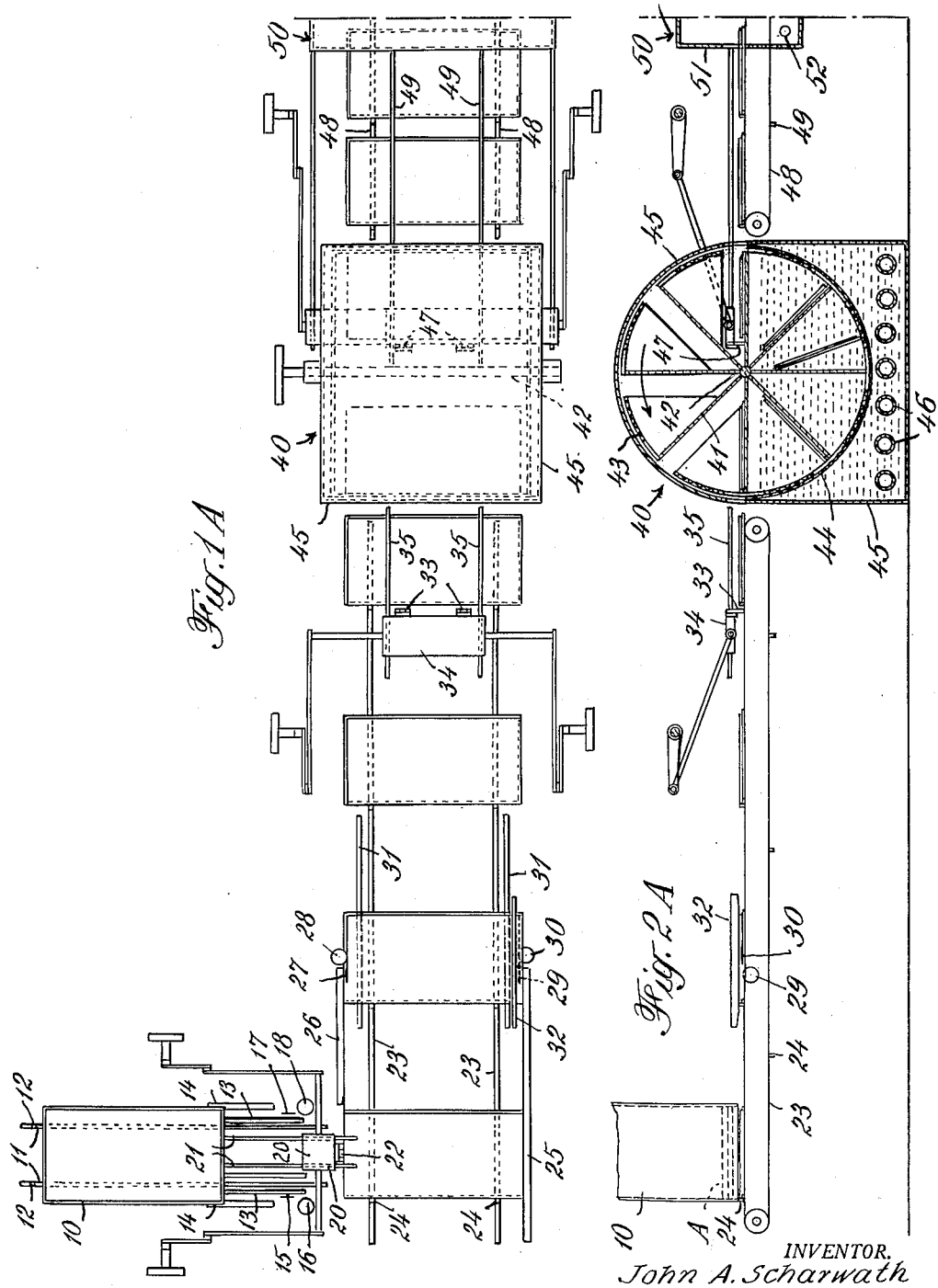
INVENTOR.
John A. Scharwath
BY
E. W. Marshall
ATTORNEY.

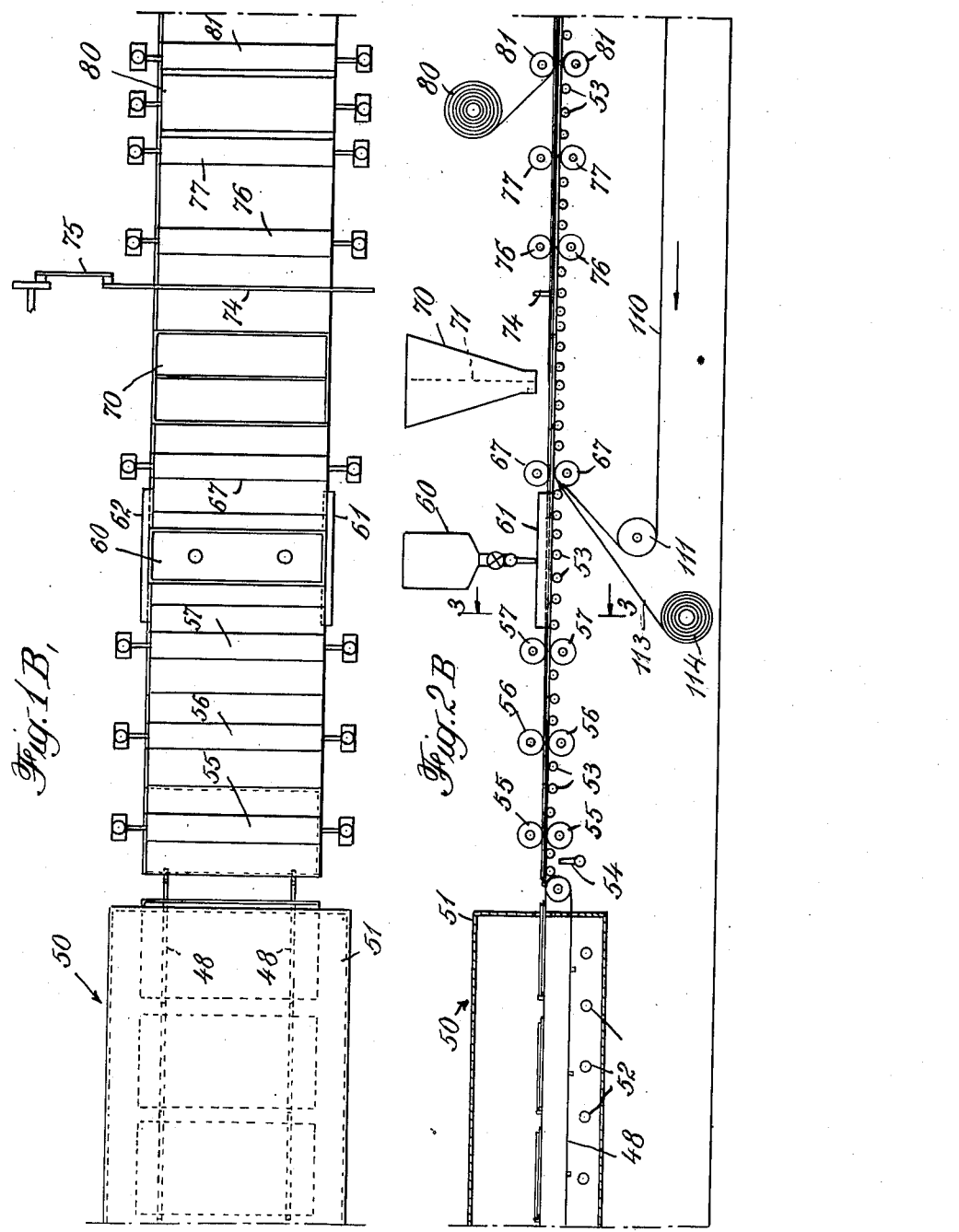

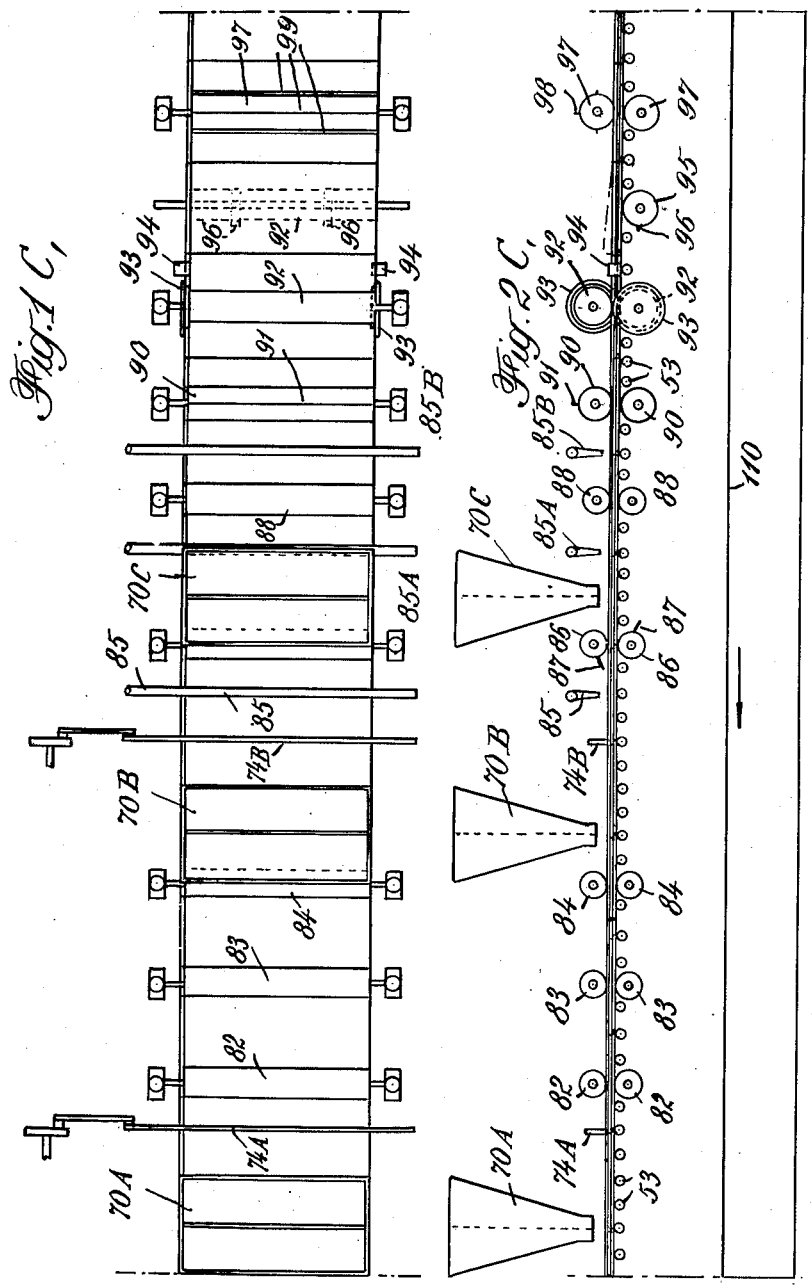

Dec. 21, 1948.   J. A. SCHARWATH   2,457,070
APPARATUS FOR MAKING BUILDING UNITS
Filed July 13, 1944   5 Sheets-Sheet 4
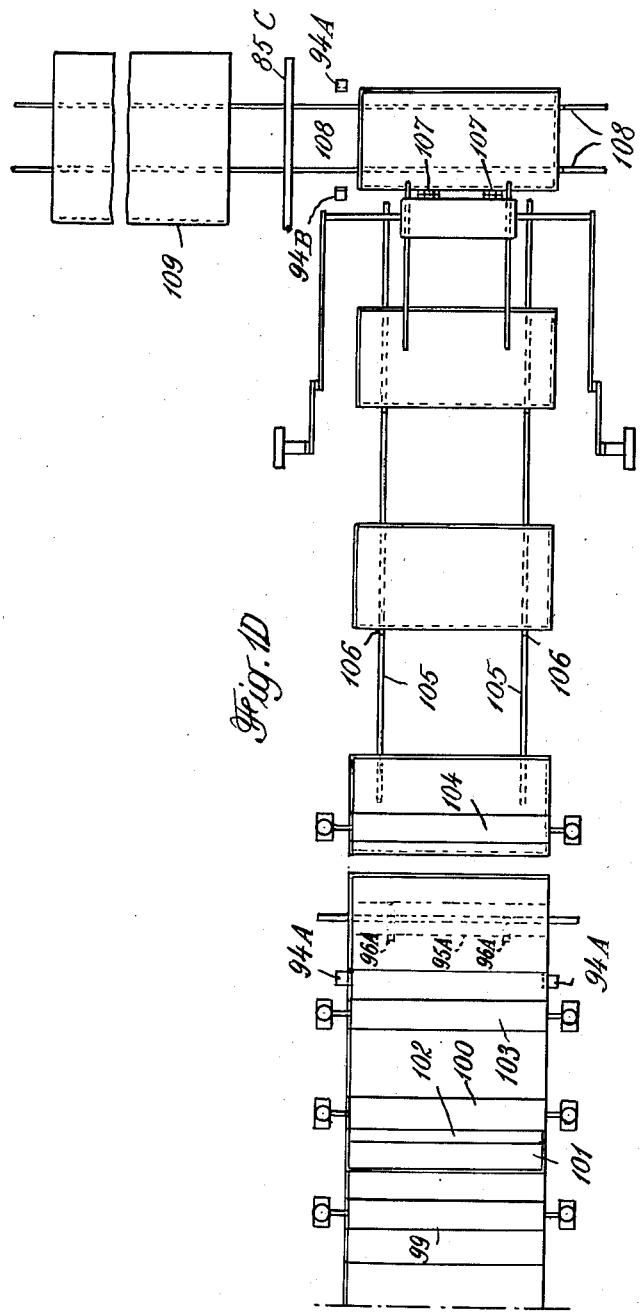
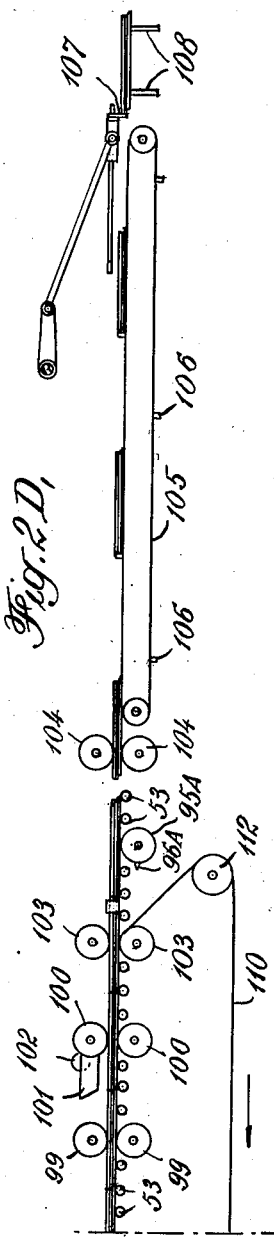
INVENTOR.
John A. Scharwath
BY
E. W. Marshall
ATTORNEY.

Dec. 21, 1948.   J. A. SCHARWATH   2,457,070
APPARATUS FOR MAKING BUILDING UNITS
Filed July 13, 1944   5 Sheets-Sheet 5
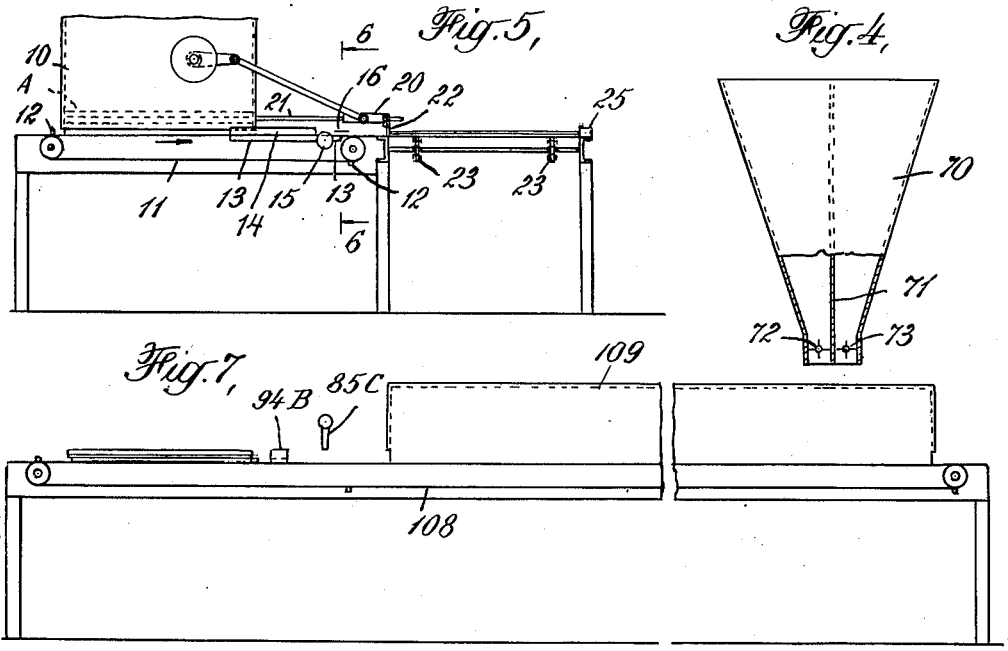
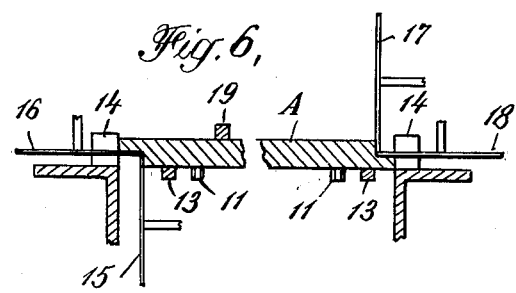
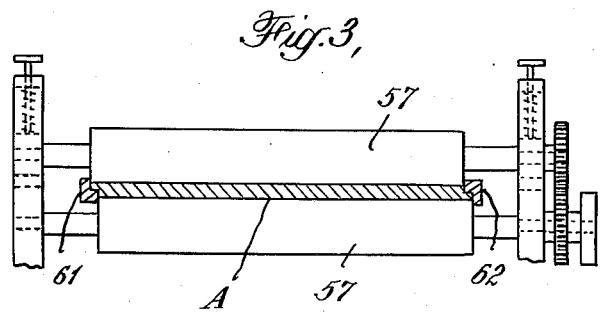
INVENTOR
John A. Scharwath
BY
E. W. Marshall
ATTORNEY Patented Dec. 21, 1948

2,457,070

UNITED STATES PATENT OFFICE 2,457,070

APPARATUS FOR MAKING BUILDING UNITS

John A. Scharwath, Montclair, N. J., assignor of one-third to Herman J. Scharwath, Union, N. J.

Application July 13, 1944, Serial No. 544,796

2 Claims. (Cl. 91—14)

This invention relates to apparatus for making building units such as a cementitious faced siding, roofing, wall or other building units.

Its object is to provide means for making entire units of cementitious material, or units having a prefabricated base of other materials with a facing of cementitious material, the facing material applied to, compacted and shaped and its surface configurated on the slabs constituting the base of the units, while said slabs are conveyed through the apparatus, the units having either a single or plural layer facing, which facing has either heat insulating or weather resisting properties, or both. The units made with this apparatus may have a plural layer facing, in which facing cementitious heat insulating and cementitious weather resisting layers may be combined, may have nailing locations indicated on the facing, may include the facing, reinforcement and one or more layers of non-cementitious heat insulating material applied in the form of sheets or in particles with preformed panels of any material, solid or variegated color matter or particles of mineral or other material embedded in the facing surface partly or entirely constituting the surface, or glaze, enamel, or plastics or other material partly or entirely constituting the surface. The outer surface may be of integral solid color or have areas of differing color in the solid color.

By cementitious material is meant Portland cement or any other indurating material alone, or combined with one or more similar materials or mixed with other ingredients, for example, the heat insulating layers may be a cementitious material mixed with one or more of the following materials, fibrous material, mica, cork, sponge, corn cobs and the like or one or more other light weight or porous or porosity producing ingredients, and with one or more ingredients of fibrous material, color, water-proofing, de-effluorescents etc., for the weather resistant or other layers. From these units may be taken parts or blanks for making manually corners for siding and wall units, and ridge caps for roofing units.

These and other objects of the invention will appear more fully in the following specification in which I will describe the invention, the novel features of which will be set forth in appended claims.

Referring to the drawings:

Figs. 1A, 1B, 1C and 1D, together form a somewhat diagrammatic plan view of an apparatus which embodies the invention.

Figs. 2A, 2B, 2C and 2D together form a side elevation of the apparatus shown in the preceding figures.

Fig. 3 is a sectional end view of a part of the apparatus shown in Fig. 2B, the section being taken on the line 3—3 of the latter figure.

Fig. 4 is a sectional elevation on a larger scale of one of the distributing hoppers.

Fig. 5 is an end elevation of the rear end of the machine which is shown in Fig. 1A.

Fig. 6 is a sectional rear elevation on a larger scale of some of the parts shown in Fig. 5, the section being taken on the line 6—6 of the latter figure.

Fig. 7 is an elevation on a larger scale of the front end of the machine which is shown in plan view in Fig. 1D.

10 is an open ended receptacle at the rear end of the machine for holding a plurality of fabricated slabs A of heat insulating material, such as that commonly made of shredded fibers or the slabs may be made of ply-wood or material having little or no heat insulating property. These prefabricated slabs can be of any size and thickness, as required, for units of the smallest size, or to the largest size required for walls and roofs of prefabricated houses. For the purpose of illustrating my invention it will be assumed that in the making of small size siding units, slabs of one-half inch thickness and of a size 12⅜" x 43¾" are used. The lower slab in the receptacle 10 rests upon a pair of spaced parallel endless chains 11, the upper end of which is spaced from the lower edge of the receptacle. Lugs 12 on these chains engage an edge of the lowermost slab and move it in the direction indicated by the arrow in Fig. 1A onto rails 13 parallel to and at the level of the upper runs of the chains 11. 14, 14, designate side rails which serve to guide the slabs. During the movement imparted to the slabs by the chains, the longitudinal edges of the slabs are scarfed on opposite sides by cutters 15, 16, 17 and 18. As shown, the cutters 15, 16 scarf the under side of the slabs on one edge and the cutters 17, 18 scarf the upper side of the opposite edge. A rail 19 over the cutters 15, 16, holds the slabs down on the cutters.

20 is a reciprocating head slidably guided on rods 21 which has a pivoted pawl 22 for engaging the rear edges of the slabs. This device pushes the slabs onto a pair of parallel endless chains 23 which are in the plane of the chains 11 and the rails 13 and are driven in a direction at right angles to that of the chains 11. Lugs 24 on the chains 23 drive the slabs. 25 is a guard rail to limit the movement of the slabs and insure their being positioned properly on the chains 23. 26 is a similar guard rail on the other side of the slabs and insure their being positioned properly on the chains 23. As the slabs are moved by the lugs 24 their short edges are scarfed by cutters 27, 28 and 29, 30. At this part of their travel the slabs are supported on rails 31.

A rail 32 over the slabs holds them down on the cutter 29 which cuts the under side of the slabs. An inspection station is provided for examining the slabs after they have been scarfed.

When the slabs near the end of the travel imparted to them by the chains 23 they are engaged by pawls 33 on a reciprocating head 34 guided on rods 35 and are pushed into an impregnator 40 containing liquid for the purpose of water proofing or fireproofing the slabs.

The impregnator has a plurality of flat screen-like blades 41 radially extending from a shaft 42 which rotates them in the direction indicated by the arrow in Fig. 2A. The rotation of the shaft can be made intermittent if desired. A cylindrical screen 43 surrounds the blades and rotates with them. This screen is provided with openings above and below the blades to provide for the admission and discharge of the slabs. 44 is a semicircular stationary screen or guard under the lower part of the screen 43. The impregnator is surrounded by a casing 45 and the liquid in the lower part of the impregnator is heated by heater coils 46 if desired.

The slabs are consecutively pushed onto the upper side of one of the blades 41 at the left, as viewed in Fig. 2A, and move over to the opposite side of the following blades as they pass through the liquid bath. The screen or guard 44 prevents the slabs from dropping through the openings in the cylindrical screen 43. When the slabs reach a position diametrically opposite that at which they entered the impregnator they are engaged by pawls 47 on a reciprocating head like those previously described which pulls them out of the impregnator and onto a pair of endless chains 48 having lugs 49 which continue their movement.

The function of the impregnator may be dispensed with, if desired, and unimpregnated slabs carried through this unit of the apparatus and onto the chains 48.

The chains 48 carry the slabs from the impregnator 40 into and through a dryer 50. An inspection space is provided between the impregnator and the dryer. The dryer comprises a casing 51 within which preferably are perforated gas heating pipes 52. The chains 48 may be extended beyond the drier to provide another inspection station.

As the slabs leave the chains 48 they run on an inspection station (not shown) and then onto a series of transfer supporting rolls 53. A spray 54 is located near the discharge end of the dryer for applying to the under surface of the slabs additional liquid flame proofing or a cementitious facing material, or the spray may be used for water cooling.

The prefabricated slabs can be scarfed and impregnated at a greater speed than that at which they can be faced, therefore production can be increased by doubling the rate of speed of the part of the apparatus back of the rolls 53 and installing a parallel facing and finishing apparatus similar to the remainder of the apparatus shown and mechanically pushing at the inspection station aforementioned, every other slab onto a similar inspection station of the parallel apparatus. Such a parallel apparatus may use the same or a different cementitious material or materials.

Before the movement imparted to the slabs by the chains 48 has ceased they are engaged by a pair of feed rolls 55. These are driven at a surface speed somewhat greater than that of the chains 48 and propel the slabs at a speed which brings them into abutting relation. If desired several pairs of feed rolls may be used as shown at 56 and 57. These feed rolls are the primary propelling source for the moving of the slabs through the facing portions of the apparatus.

60 is a reservoir for a liquid or semi-liquid adhesive material which is deposited on the upper surface of the slabs. Side rails 61, 62, are preferably formed to fit the scarfed edges of the slabs as shown in Fig. 3. Similar side rails may be provided at other parts of the apparatus.

67 is a pair of rolls which serve the double function of leveling the adhesive material on the slabs and causing them to pass under a hopper 70.

The hopper 70 as shown in Fig. 4 is divided by a wall 71 into two compartments each of which has its own discharge spout. The left hand compartment may contain a fibrous material to assist in bonding cementitious material to the slabs, and the other compartment, material which will constitute the facing of a single layer type of cementitious faced unit, or both compartments may contain material constituting a plural layer type of cementitious faced unit. Independently driven rotary distributors 72 and 73 control the rate of discharge of these materials which are deposited on the slabs as they pass under the hopper.

The deposited material is leveled by a horizontal screed 74 located beyond the hopper 70. The screed is reciprocated by a mechanism shown at 75. The material is further leveled, compacted and pressed onto the slabs by rolls 76 and 77.

80 is a roll of reinforcement which may be a fabric or a metallic webbing or it may be a roll of heat insulating material. This passes under the upper of a pair of rolls 81 and is laid on the material which has been deposited on the slabs, or provision may be made for including both a reinforcement and a heat insulating material in the facing deposited on the slabs.

If it is desired to add another layer of the same mix, or a different mix, or of different material to the layer of material already on the slab, a further deposit of the desired material is dropped from a hopper 70A onto the material already on the slabs. This additional deposit may also be fibers or particles of heat insulating material in loose form. After the slabs pass under the hopper 70A the deposit is leveled by a screed 74A like that previously described, and compacted by rolls 82, 83 and 84. This operation may be repeated as many times as desired by the use of more hoppers and screeds such as those shown at 70, 74; 70A, 74A; 70B, 74B and rolls 70, 77, 82, 83 and 84.

85 is a spray located beyond the hopper 70B and indicates another method by which cementitious material may be applied. Other methods are by means of extrusion or discharge direct from a mixing unit. 86 is another pair of rolls. These are shown provided with scrapers 87 and if desired all the feed and press rolls may be provided with similar scrapers. The upper rolls of each set from 55 to 104 may be internally or externally heated or cooled.

70C is another hopper like that shown in Fig. 4. Its first or both of its compartments may contain dry coloring matter and the discharge thereof onto the facing may be made to cover the entire surface of the facing with one color or to have areas of differing color included in the solid color. Its second or both of its compartments may contain particles of mineral or other material to be embedded into the surface of the facing or to become the surface of the facing and the discharge thereof so controlled as to cover the entire surface of the facing with one kind of particles or color or to include in the one kind of particles or color areas of differing particles or color.

Sprays 85A and 85B located beyond the hopper 70C are for applying additional cementitious facing material, wetting agents, waterproofing, liquid, coloring matter, glaze, enamel, plastics or other sprayable material suitable as a facing surface. Between them is a pair of rolls 88.

The upper roll of the next pair 90 has a transverse knife 91 which cuts into the facing material and through the reinforcement or insulating material which has been deposited on the slabs. This roll is timed to make the cut on lines where adjacent slabs abut one another. The knife cuts through the base itself if it has been formed on the machine.

The upper roll of the next pair of rolls 92 is provided with spaced cutters 93 to trim the outer edges of the slabs and the material which has been deposited on them, or this function may be performed by stationary scrapers 94. The cutters 93 or the scapers 94 also remove excess material from these edges.

The slabs next pass over a breaker roll 95 which has a transverse protuberance 96. This roll is so timed that its protuberance engages and lifts the rear end of each unit as it passes while the next succeeding unit is held down by the upper roll of the pair 93.

The upper roll of the next pair 97 is provided at certain parts of its periphery with grouped spaced knives 98 to impress indentations in desired portions of the upper surface of the facing to make simulations of wire cuts in such units to imitate brick or stone facing.

The units then pass between a pair of rolls 99 the upper roll of which shapes the facing material to simulate brick, stone, clapboards, novelty or other sidings, shingles, slate, tile and other roofings, wall and other exterior or interior building units, and with any desired surface configuration. It may also make indentations to indicate nailing locations.

Similarity to the appearance of real brick or stone is further enhanced by the application of contrasting coloring matter in the indentations which have been made to represent mortar lines. This is effected by the upper roll of a pair 100 to which coloring matter is transferred from a receptacle 101 by a roll 102 to the mortar line forming parts of the upper roll.

The units continue between rolls 103 and over another breaker roll 95A which has a protuberance 96A. Another pair of scrapers is shown at 94A.

The units then pass between a pair of feed rolls 104 which are driven at an accelerated speed to separate the units and deliver them one by one to a pair of chains 105, also operating at accelerated speed, having driving lugs 106. The chains 105 carry the spaced units across an inspection station and pawls 107 push them off the chains 105 onto a pair of transverse chains 108 at the front end of the machine.

While on the chains 108 the units are carried between scrapers 94B under a spray 85C and into and through a chamber 109. The scrapers remove any excess material which may have adhered to the longer edges of the units. The spray 85C may be used for applying additional waterproofing, glaze, enamel, plastics or other fluid material. The chamber 109 is provided with radiant heat whereby the glaze, enamel or plastic is dried, baked or vitrified.

When the units emerge from the chamber 109 they are transferred to curing facilities.

By running an endless belt 110 between the rolls 67 (Fig. 2B) and rolls 103 (Fig. 2D), between the intermediate rolls and over the intermediate supporting rolls and around guide rolls 111 and 112 the use of prefabricated slabs as the base of the units is eliminated. Cementitious material to form the base of the units can be deposited and compacted directly on the belt by the first depositing instrumentalities of the apparatus, and any type of facing deposited or fabricated on the base thus formed by the other instrumentalities of the apparatus. A backing sheet 113 may be run over the belt 110 from a supply roll 114 to become a permanent part of the finished product.

I have described the invention somewhat comprehensively as it is obvious that endless variations may be made to meet commercial requirements. The base or facing may have heat insulating or weather resisting layers or both and gypsum, lime and other setting or indurating materials may be substituted for Portland cement, magnesite and the like. Units of any desired size or thickness may be made with prefabricated bases of any desired material or thickness, or with bases of any desired cementitious material or thickness. The facings may be of any material which can be deposited, compacted or shaped on the apparatus. Some building units are provided with an outer layer of glass, wood, metal or foil, and it is possible to utilize the apparatus herein disclosed to make such units.

The apparatus has been described as operating continuously but an intermittent motion may be imparted to any or all of its parts. The functions of the various apparatus parts can be performed separately or in conjunction with or augmented or supplemented by any other selected or added part, and the number, kind and location of its parts or the members of its parts may be varied at will.

The facing may be compacted, shaped and its surface configurated by other than rotary means, or in conjunction with rotary means, and this may be done while the slabs or units are in motion or at rest.

Various modifications in construction, mode of operation, use and method of an invention may and often do occur to others, especially after benefitting from knowledge of such a disclosure as that herein presented of the principles involved, but the invention itself is not confined to the present showing.

I claim:

1. In an apparatus for making building units, means for moving a plurality of separated prefabricated slabs in a plane in one general direction, means for passing the separated slabs through a liquid and drying said slabs, means for moving the slabs in the same general direction into abutting relation, and a plurality of longitudinally spaced instrumentalities positioned for successively acting upon the abutted moving slabs, said instrumentalities comprising means for depositing material on the upper surface of the slabs, means for compacting and shaping said material on the slabs, means for severing the deposited material on the lines of abutment between adjacent slabs, means for breaking the covered slabs apart at the lines of severance, and means for accelerating the movement of the slabs to separate the slabs from one another.

2. In an apparatus for making building units, means for moving a plurality of separated prefabricated slabs in a plane in one general direction, means for passing the separated slabs through a liquid and drying said slabs, means for moving the slabs in the same general direction into abutting relation, and a plurality of longitudinally spaced instrumentalities positioned for successively acting upon the abutted moving slabs, said instrumentalities comprising means for depositing material on the upper surface of the slabs, means for compacting and shaping said material on the slabs, means for severing the deposited material on the lines of abutment between adjacent slabs, means for breaking the covered slabs apart at the lines of severance, means for surface configurating the material, and means for accelerating the movement of the slabs to separate the slabs from one another.

JOHN A. SCHARWATH.

REFERENCES CITED

The following references are of record in the file of this patent:

UNITED STATES PATENTS

| Number | Name | Date |
|---|---|---|
| 725,930 | Cheney | Apr. 21, 1903 |
| 1,263,051 | Ford | Apr. 16, 1918 |
| 1,274,830 | Wood | Aug. 6, 1918 |
| 2,207,782 | Carlson | July 16, 1940 |
| 2,228,807 | Bacher | Jan. 14, 1941 |
| 2,288,585 | Partee et al. | June 30, 1942 |
| 2,308,589 | Davis | Jan. 19, 1943 |
| 2,321,397 | Koch | June 8, 1943 |
| 2,333,998 | Gordon | Nov. 9, 1943 |
| 2,355,278 | Davis | Aug. 8, 1944 |